United States Patent
Futa, Jr. et al.

[11] Patent Number: 6,135,135
[45] Date of Patent: Oct. 24, 2000

[54] FORCE BALANCED PROPORTIONAL BYPASS VALVE

[75] Inventors: Paul W. Futa, Jr., North Liberty; Russell Crews Perkey, Granger, both of Ind.

[73] Assignee: AlliedSignal Inc., Moristown, N.J.

[21] Appl. No.: 08/989,954

[22] Filed: Dec. 12, 1997

[51] Int. Cl.[7] .................................................. F02C 9/26
[52] U.S. Cl. ........................ 137/115.03; 137/115.07; 137/312
[58] Field of Search .................. 137/115.03, 115.07, 137/312

[56] References Cited

U.S. PATENT DOCUMENTS

| | | | |
|---|---|---|---|
| 2,977,971 | 4/1961 | Ruhl | 137/115.07 |
| 2,989,975 | 6/1961 | Gartner | 137/117 |
| 3,106,934 | 10/1963 | Rogers | 137/117 |
| 3,282,323 | 11/1966 | Katz et al. | 137/115.03 |
| 4,339,917 | 7/1982 | Lagrone | 60/39.28 |
| 4,346,727 | 8/1982 | Stumpp et al. | 137/115.07 |
| 4,422,470 | 12/1983 | Jackson et al. | 137/484.2 |
| 4,574,939 | 3/1986 | Dubuit | 198/396 |
| 4,738,597 | 4/1988 | d'Agostino et al. | 417/282 |
| 4,817,375 | 4/1989 | Brocard et al. | 60/39.281 |
| 5,020,315 | 6/1991 | Leachman, Jr. et al. | 60/39.281 |
| 5,133,181 | 7/1992 | Moore, Jr. | 60/39.281 |
| 5,215,114 | 6/1993 | Breyer | 137/469 |
| 5,235,806 | 8/1993 | Pickard | 60/39.281 |
| 5,513,493 | 5/1996 | Severn et al. | 60/39.281 |
| 5,632,299 | 5/1997 | Weinhold | 137/111 |

FOREIGN PATENT DOCUMENTS 0 274 833  11/1988  European Pat. Off. .......... F15B 9/10

OTHER PUBLICATIONS

International Search Report PCT/US98/26564.

*Primary Examiner*—Stephen M. Hepperle
*Attorney, Agent, or Firm*—Larry J. Palguta

[57] ABSTRACT

An unbalance compensated bypass valve (23) for a gas turbine engine fuel supply system is responsive to the fuel pressure differential across a fuel metering valve (15) to open and close a bypass orifice (37, 39, 41). The bypass valve (23) selectively supplies high fuel pressure to providing a counterbalancing force against an annular area (47) of the bypass valve piston 34 to compensate for increased restorative forces of a helical reference spring (57) as that spring is compressed as well as to compensate for other unbalance conditions within the valve (23). The piston (34) includes additional sidewall openings (69, 70, 71) which function during a "shut-off" condition to divert all fuel flow from an inlet of the metering valve (15) back to a fuel pump (13) inlet. The piston (34) also includes further sidewall openings (73, 75) which provide a controlled fuel leakage from a bypass valve inlet line (25) to the bypass valve pressure sensing inlet (29).

12 Claims, 3 Drawing Sheets

FORCE BALANCED PROPORTIONAL BYPASS VALVE

The present invention relates generally to methods and apparatus for fuel flow control and more particularly to a fuel bypass valve which diverts fuel from a fuel pump outlet in an attempt to maintain a constant pressure drop across a fuel metering valve located downstream of the fuel pump. In particular, the bypass valve of the present invention compensates for imbalances caused by changes in the fuel flow rate through the bypass valve or caused by the pressure drop across the bypass valve to more closely maintain the pressure differential across the metering valve constant.

In aircraft fuel control systems, it is common to control the head or pressure differential across a fuel system metering valve by diverting part of the output from a fuel pump back to the inlet of that fuel pump. In such known systems, the pressure differential across the metering valve may, for example, be applied to a spring loaded diaphragm. That diaphragm may be coupled to a bypass valve and if the pressure differential across the metering valve becomes too large, the diaphragm moves so as to open the bypass valve and spill some of the fuel from the outlet back to the pump inlet. Similar systems employing a spring biased piston coupled to a bypass valve arrangement are also known. The mechanism which senses the pressure differential across the metering valve may be a separate component or may be an integral part of the bypass valve.

With such known bypass valves, if the bypass orifice opens further to divert greater quantities of fuel, the piston or diaphragm must move against the force of the bias spring. The spring is deformed increasing its restorative force. When the piston or diaphragm again achieves equilibrium, the forces on opposite diaphragm or piston sides are again equal, but the pressure differential is not the same as it was since one of the pressures is now being supplemented by a greater spring force. Other factors such as Bernoulli forces created by the fuel flow may also contribute to this problem. Thus, flow unbalance on the piston of a bypass valve increases as the quantity of flow returned to the pump inlet is increased. Also, the unbalance increases as the pressure drop across the bypass valve increases. These unbalance forces act to close the valve. In order to counteract these forces, the regulated pressure drop across the metering valve must increase resulting in an inaccurate control of metering head. It is highly desirable to minimize or eliminate the variations from constant metering valve head created by changes in bypass flow or bypass orifice pressure drop.

Matched flow grinding of the bypass valve components to direct the fuel flow along certain paths in an attempt to cause the fuel flow alone to compensate for such imbalance is known. Such measures have met with some success, but add significantly to the cost of a bypass valve.

More complex bypass valve configurations, such as providing a dual piston configuration with a pair of balanced high fuel pressure fuel inlets to either side of the low or return fuel outlet have also met with some success, but contribute significantly to the weight, complexity and cost of the bypass valve.

It would also be highly desirable to minimize or eliminate the variations from constant metering valve head created by changes in bypass flow or bypass orifice pressure drop without contributing significantly to the cost or weight of the bypass valve.

The present invention overcomes the prior problems and achieves the aforementioned goals by restricting the outlet area of a bypass valve downstream of the bypass ports thus creating an intermediate fuel pressure region between the two ports. This intermediate pressure is applied against an annular area of the piston and is opposed by the pump inlet pressure. As bypassed flow increases, the counterbalancing pressure increases. Proper sizing of the piston annulus and the outlet areas provides a force on the piston essentially equal to the flow unbalance, but in the opposite direction which eliminates most head shift.

In accordance with one form the invention, a fuel bypass valve selectively diverts fuel from the outlet of the fuel pump back to the inlet of the fuel pump to maintain the fuel pressure differential between the inlet and the outlet of a variable orifice metering valve substantially constant. The valve comprises a variable size bypass orifice, a movable piston for varying the size of the bypass orifice with the movable piston being urged in a direction to open the bypass orifice by high fuel pressure from the metering valve inlet and urged in a direction to close the bypass orifice by intermediate fuel pressure from the metering valve outlet. A supplemental fuel pressure arrangement including an annular region of the piston augments the effect of the high fuel pressure to aid in moving the piston in the direction to open the bypass orifice. High fuel pressure is applied to the annular region of the piston from an annulus defined, in part, by the annular region of the piston and, in part by an annular groove in the valve housing. This annulus has the bypass orifice as an inlet and a flow restricting outlet coupled to the fuel pump inlet. The flow restricting outlet is sized so that the variable fuel pressure is substantially the same as the low fuel pressure when the bypass orifice is closed, and somewhat rises above the low fuel pressure when the bypass orifice opens.

In accordance with another aspect of the invention, a bypass valve maintains a pressure differential between a high pressure source and a monitored intermediate pressure substantially constant and includes a valve housing having an inlet port adapted to be coupled to the high pressure source, a first inner annular fluid flow region communicating with the outlet port, an outlet port adapted to be coupled to a low pressure return, a sensing port adapted to receive the intermediate pressure, and a second annular fluid flow region communicating with the sensing port. There is a movable piston disposed within the valve housing for reciprocable motion along an axis. The piston has a pair of opposed faces and a hollow interior region including first and second sets of sidewall openings. The hollow piston interior is coupled to the inlet port. The first set of sidewall openings and the first inner annular region define a variable size bypass orifice for controlling fluid flow from the inlet port to the outlet port. The second set of sidewall openings together with the second inner annular region provide a substantially unrestricted flow of fluid from the inlet port to the outlet port in "shut-down" situations. The piston includes a third set of sidewall openings for providing a controlled leakage of fluid across the piston from the inlet port to the sensing port.

The present invention comprises a bypass valve for selectively diverting fluid from a high pressure source to a low pressure return for maintaining substantially constant a pressure differential between the high pressure of the source and a monitored intermediate pressure comprising: a valve housing including an inlet adapted to be coupled to the high pressure source, a first inner annular fluid flow region communicating with an outlet adapted to be coupled to the low pressure return, a sensing inlet adapted to receive the intermediate pressure, and a second annular fluid flow region communicating with the sensing inlet; a movable piston disposed within the valve housing for reciprocable motion along an axis and having a pair of opposed faces and a hollow interior region including first and second sets of sidewall openings, the hollow interior coupled to the high pressure source inlet to receive fluid therefrom, the first set of sidewall openings cooperating with the first inner annular region to define a variable size bypass orifice for controlling fluid flow from the high pressure source inlet to the outlet, and the second set of sidewall openings cooperating with the second inner annular region to provide a substantially unrestricted flow of fluid from the high pressure source inlet to the outlet.

Corresponding reference characters indicate corresponding parts throughout the several views of the drawing.

Figure 1:
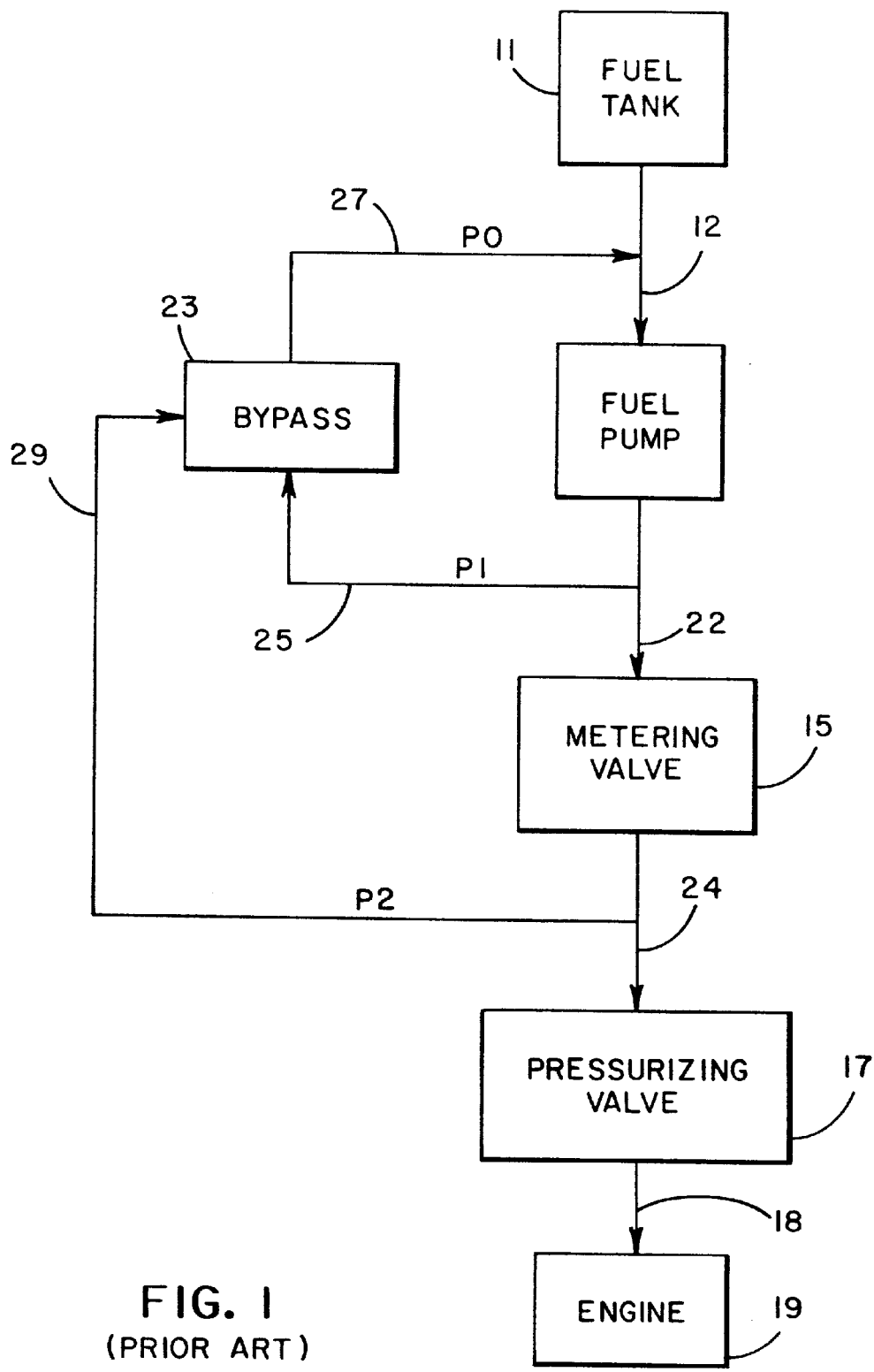
FIG. 1 is a schematic representation of an illustrative aircraft fuel system employing the bypass valve of the present invention.

In FIG. 1, an illustrative aircraft fuel supply system includes a supply tank 11 from which fuel is fed by pump 13 to a variable orifice metering valve 15 and through a pressurizing valve 17 to an engine 19. The pressure differential or head P2–P1 is supplied to a bypass valve 23 by lines or inlets 25 and 29. The pressurizing valve 17 maintains a reference pressure level P2 on the downstream side 24 of the metering valve 15 so that the bypass valve 23 may selectively divert fuel from line 25 back through outlet or line 27 to the inlet or line 12 of the fuel pump 13 to maintain a constant head or pressure drop across the metering valve 15.

Figure 2:
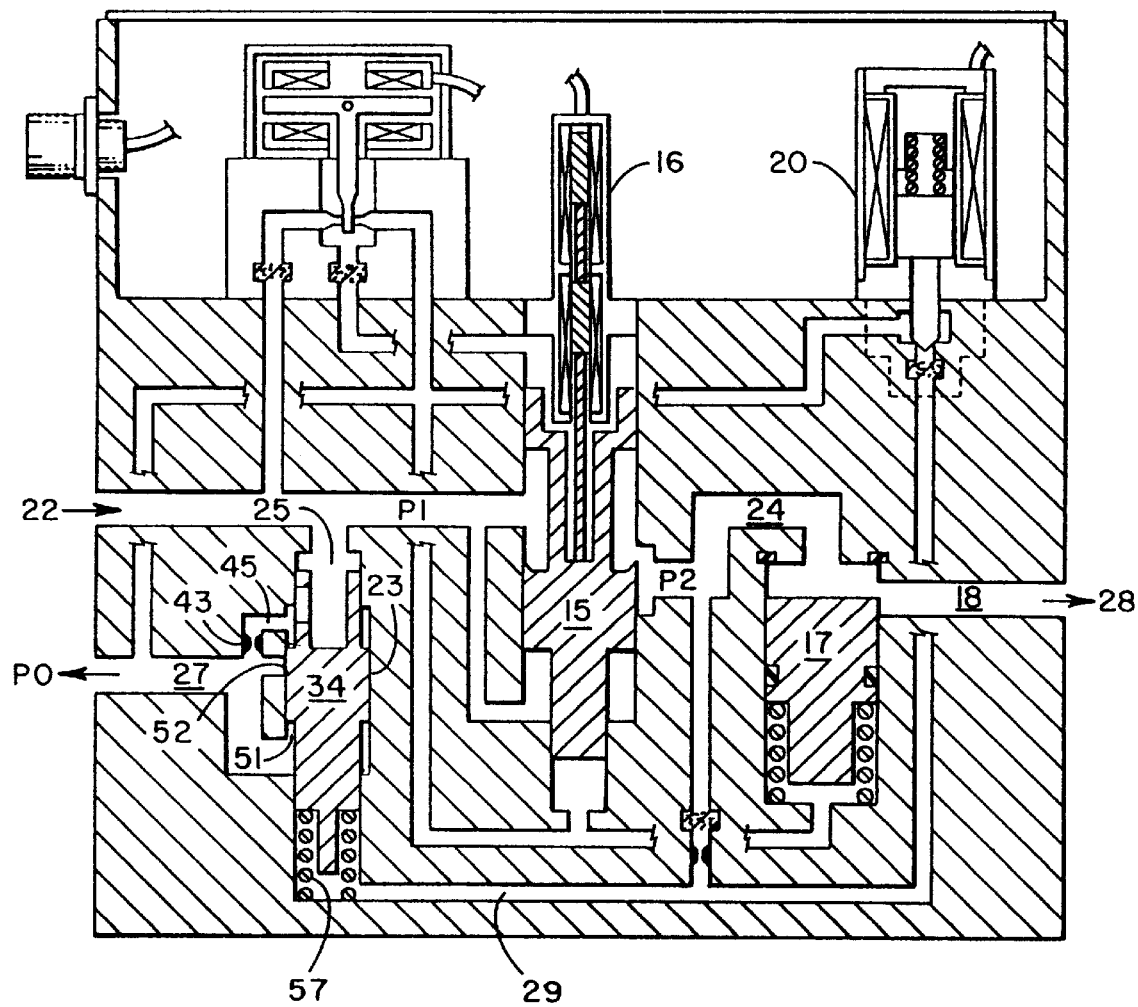
FIG. 2 is a more detailed schematic representation of a fuel metering unit incorporating the invention in one form.

A fuel control system incorporating the features of FIG. 1 is shown in FIG. 2. Here the incoming fuel at pump outlet or line line 22 at pressure P1 passes to the metering valve 15. A sensor 16 provides an electrical indication of the metering valve orifice for control purposes. The metering valve outlet or line 24 supplies P2 pressure fuel to the pressurizing valve 17 and that fuel passes by way of line 18 to the engine 19 as indicated by arrow 28. P2 pressure fuel is also supplied by sensing line 29 to the bypass valve 23. The proportional bypass valve 23 diverts fuel back to low pressure return line 27 at pressure P0 to maintain the desired pressure differential across metering valve 15.

FIG. 2 also includes a shutoff/overspeed solenoid valve 20 shown in the "run" or closed position. In a "shut-off" condition, the solenoid valve 20 functions to vent P2 pressure from line 29 to P0 pressure and from one side of piston 34 of the bypass valve 23. High pressure P1 is still acting on the other face of piston 34 and the piston moves to the extreme open (downward as viewed in FIG. 2, rightward as viewed in FIG. 3) position allowing direct fuel flow from the hollow piston interior to the outlet port 52 by way of the piston sidewall aperture and to return line 27. In this position, P1 pressure in inlet line 25 is vented to P0 pressure, lowering P1 pressure to P0 pressure. This low P1 pressure condition causes pressurizing valve 17 to close, shutting off fuel flow through line 18 to the engine 19. The details of bypass valve 23 are better seen in FIG. 3.

Figure 3:
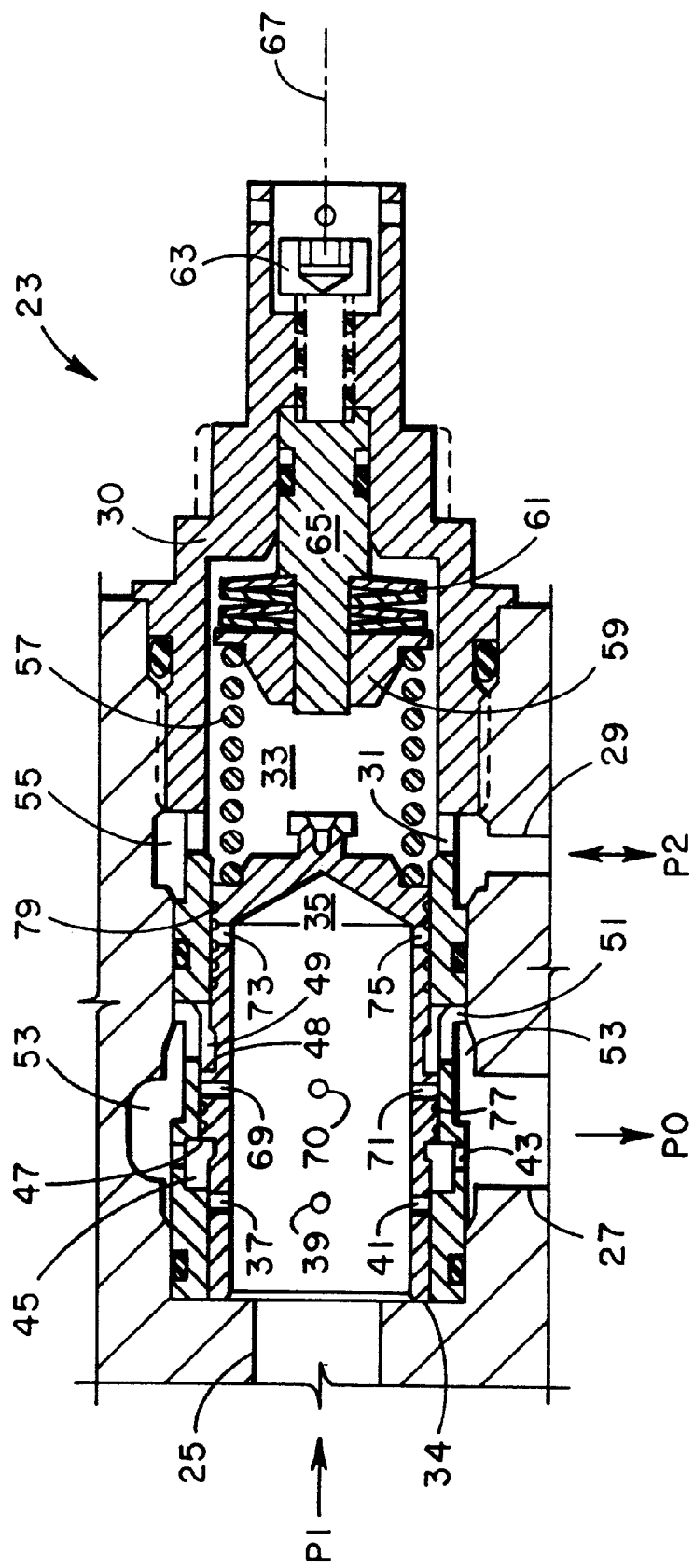
FIG. 3 is a cross-sectional view of one implementation of a displacement compensated proportional bypass valve.

In FIG. 3, bypass valve 23 comprises a valve housing 30 including an inlet line 25 which is adapted to be coupled to the high pressure P1 source. The housing includes first 53 and second 55 annular fluid flow paths surrounding the movable piston member 34. There is an outlet line 27 connected to the annular flow path 53 and adapted for low P0 pressure return. Finally, there is a sensing line 29 coupled to the annular flow path 55 and adapted to receive the intermediate pressure P2 from an outlet of the metering valve 15. A movable piston 34 is reciprocably supported in housing 30 for movement back and forth along axis 67 and has one piston face acted upon by pressure in cavity 33 while the other piston face receives pressure from cavity 35. In its leftmost position as viewed, the piston 34 substantially blocks any fuel flow from the inlet line 25 to the outlet line 27. In the rightmost piston position, fuel may flow freely through openings 69, 70 and 71 from the hollow piston interior 35, supplementing flow through openings 37, 39 and 41 that is restricted by orifice 43. The outward flow is through annular fluid flow path 53 and the return line 27. This extreme piston position corresponds to the "shut-off" condition discussed in conjunction with FIG. 2.

Piston 34 also has a range of intermediate positions in which high pressure fluid in the hollow piston interior 35 is applied to one piston face to urge the piston toward the extreme open position while intermediate pressure fluid in chamber 33 supplied from sensing line 29 by way of apertures such as 31 is applied to the opposite piston face to urge the piston toward the minimum flow, closed position, or no bypass condition. Since the fluid pressure force urging the piston toward the right or open extreme position is greater than the fuel pressure tending to close the valve, the piston 34 is also urged toward the left by a helical reference spring 57. Spring 57 is compressed between the piston 34 and a spring retainer 59. Retainer 59 is supported by an adjustment plug 65. The initial compression of the reference spring 57 is set by an adjustment screw 63. A bi-metal disk group 61 controls the spacing between retainer 59 and adjustment plug 65 and provides additional spring compression as the system warms to offset reductions in fuel specific gravity and loss of spring force due to heating. These intermediate piston positions allow a controlled bypassing of fluid from the source or inlet line 25 to the return or outlet line 27 for maintaining the pressure differential substantially constant.

Piston 34 has a hollow interior region or cavity 35 which communicates with the inlet line 25. The cavity 35 is essentially the interior of a cylindrical shell or piston skirt and includes a plurality of sidewall openings. The first set of openings 37, 39 and 41 cooperate with the annular fluid flow or counterbalancing force region 45 to define the bypass orifice. Note that there are actually several different holes forming this aperture. Hence, "aperture" or "orifice" as used herein includes single or multiple openings. The sidewall openings 37, 39 and 41 are staggered and of various sizes to achieve the desired variable size bypass orifice, dynamic response and bypass flow for a given application.

The piston skirt includes a second set of sidewall openings such as 73 and 75 which appear to be without purpose. There are a number of pressure balance grooves such as 77 and 79 in the piston periphery. Since the pressure in cavity 35 is slightly greater than that in cavity 33, there will be a slight leakage from apertures 73 and 75 by way of grooves such as 79 into cavity 33. This may be easily compensated for or calibrated out since the pressure difference is the desired constant pressure differential across the metering valve. Were these apertures absent, leakage would be from the relatively high variable pressure cavity 33 to the low pressure return annulus 53. This leakage would be uncontrolled and not easily compensated for.

The piston skirt includes a third set of sidewall openings 69, 70, 71 which are effective only in the wide open extreme position to provide a substantially unrestricted flow of fuel from the high pressure source or inlet line 25 to the low pressure return line or outlet port 27 by way of the annulus 49 and port 51.

As the bypass aperture opens further and bypass flow increases, spring 57 is compressed further and supplies a greater restorative force to the piston 34. Hence, the pressure differential between cavities 35 and 33 increases. To compensate for this and other unbalance conditions such as flow or Bernoulli forces, the counterbalancing force region 45 receives a variable fluid pressure for supplying a variable counterbalancing force to the piston 34 to urge the piston toward the extreme open position. The counterbalancing force varies to compensate for the variable force applied to the piston by the spring 57 as the piston moves. Thus, supplemental fuel pressure augments the rightward or opening force on piston 34 by applying a pressure to the annular region 45 within the bypass valve defined in part by an annular area 47 of the movable piston member 34. Annular region 45 has the bypass orifice 37, 39, 41 as an inlet and the flow restricting outlet including orifice 43 (which may comprise several openings) coupled to the fuel pump inlet by line 27. The flow restricting outlet is sized so that the supplemental or variable fuel pressure applied to the annular surface 47 is substantially the same as the low fuel pressure when the bypass orifice 37, 39, 41 is closed, and is somewhat above the low fuel pressure when the bypass orifice opens. P0 pressure is also applied to the annular surface 48 by way of annuli 49 and port 51. Since P0 is slightly below the pressure in the restricted outlet annular region 45, there is a net pressure differential augmenting the inlet pressure in chamber 35 and balancing the unbalance forces on the piston.

What is claimed is:

1. A bypass valve for diverting selectively fluid from a high pressure source to a low pressure return for maintaining substantially constant a pressure differential between the high pressure of the source and a monitored intermediate pressure comprising:

a valve housing including an inlet adapted to be coupled to the high pressure source, an outlet adapted to be coupled to the low pressure return, and a sensing inlet adapted to receive the intermediate pressure;

a movable piston having a pair of opposed faces and disposed within the valve housing for reciprocable motion along an axis, the piston having one extreme position allowing maximum flow of fluid from the high pressure source inlet to the outlet, another minimum flow extreme position substantially blocking any fluid flow from the high pressure source inlet to the outlet, and a range of intermediate positions allowing a controlled bypassing of fluid from the source to the return for maintaining the pressure differential substantially constant, the piston having a hollow interior region communicating with the high pressure source inlet and including a plurality of sidewall openings, the housing including an inner annular region communicating with the outlet, and the sidewall openings and annular region cooperating to define a variable size bypass orifice;

means within the housing for supplying high pressure fluid from the high pressure source inlet to one piston face to urge the piston toward the one extreme position;

means within the housing for supplying intermediate pressure fluid from the sensing inlet to another piston face to urge the piston toward the minimum flow extreme position;

spring means within the housing engaging and applying a variable force to the piston to urge the piston toward the minimum flow extreme position; and a counterbalancing force region associated with the piston and receiving a variable fluid pressure for supplying a variable counterbalancing force to the piston to urge the piston toward the one extreme position, the counterbalancing force varying to compensate for the variable force applied to the piston by the spring means as the piston moves.

2. The bypass valve of claim 1, for use in a fuel control system for supplying fuel from a fuel tank to an engine wherein the difference between high fuel pressure and monitored intermediate fuel pressure comprises the pressure differential across a variable orifice fuel metering valve.

3. The bypass valve of claim 1, wherein the piston includes a second set of sidewall openings for provided a controlled leakage of fluid across the piston from the high pressure fluid to the intermediate pressure fluid.

4. The bypass valve of claim 3, wherein the piston includes a third set of sidewall openings effective only in the one extreme position to provide a substantially unrestricted flow of fluid from the high pressure source to the low pressure return.

5. The bypass valve of claim 3, wherein the counterbalancing force also varies to compensate for flow forces affecting the movable piston.

6. A bypass valve for selectively diverting fluid from a high pressure source to a low pressure return for maintaining substantially constant a pressure differential between the high pressure of the source and a monitored intermediate pressure comprising:

a valve housing including an inlet adapted to be coupled to the high pressure source, a first inner annular fluid flow region communicating with an outlet adapted to be coupled to the low pressure return, and a sensing inlet adapted to receive the intermediate pressure;

a movable piston disposed within the valve housing for reciprocable motion along an axis and having a pair of opposed faces and a hallow interior region including first and second sets of sidewall openings, the hollow interior coupled to the high pressure source inlet to receive fluid therefrom, the first set of sidewall openings cooperating with the first inner annular fluid flow region to define a variable size bypass orifice for controlling fluid flow from the high pressure source to the low pressure return, and the second set of sidewall openings providing a controlled leakage of fluid across the piston from the high pressure source inlet to the sensing inlet.

7. The bypass valve of claim 6, further including a counterbalancing force region associated with the piston and receiving a variable fluid pressure for supplying a variable counterbalancing force to the piston to urge the piston in a direction to increase the size of the variable bypass orifice to compensate for variable unbalance forces applied to the piston.

8. The bypass valve of claim 7, wherein the counterbalancing force region comprises an annular fluid flow region within the bypass valve defined in part by the first inner annular region and having the bypass orifice as an inlet and a flow restricting outlet communicating with the outlet.

9. The bypass valve of claim 6, wherein the housing includes a second annular fluid flow region communicating with the inlet, and the piston further includes a third set of sidewall openings cooperating with the second annular fluid flow region to provide a substantially unrestricted flow of fluid from the high pressure source inlet to the outlet.

10. A bypass valve for selectively diverting fluid from a high pressure source to a low pressure return for maintaining substantially constant a pressure differential between the high pressure of the source and a monitored intermediate pressure, comprising:

a valve housing including an inlet adapted to be coupled to the high pressure source, a first inner annular fluid flow region communicating with an outlet adapted to be coupled to the low pressure return, a sensing inlet adapted to receive the intermediate pressure, and a second annular fluid flow region communicating with the outlet;

a movable piston disposed within the valve housing for reciprocable motion along an axis and having a pair of opposed faces and a hollow interior region including first, second and third sets of sidewall openings, the hollow interior coupled to the high pressure source inlet to receive fluid therefrom, the first set of sidewall openings cooperating with the first inner annular region to define a variable size bypass orifice for controlling fluid flow from the high pressure source inlet to the outlet, the second set of sidewall openings cooperating with the second inner annular region to provide a substantially unrestricted flow of fluid from the high pressure source inlet to the outlet, and the third set of sidewall openings for providing a controlled leakage of fluid across the piston from the high pressure source inlet to the sensing inlet.

11. A bypass valve for selectively diverting fluid from a high pressure source to a low pressure return for maintaining substantially constant a pressure differential between the high pressure of the source and a monitored intermediate pressure, comprising:

a valve housing including an inlet adapted to be coupled to the high pressure source, a first inner annular fluid flow region communicating with an outlet adapted to be coupled to the low pressure return, a sensing inlet adapted to receive the intermediate pressure, and a second annular fluid flow region communicating with the outlet;

a movable piston disposed within the valve housing for reciprocable motion along an axis and having a pair of opposed faces and a hollow interior region including first and second sets of sidewall openings, the hollow interior coupled to the high pressure source inlet to receive fluid therefrom, the first set of sidewall openings cooperating with the first inner annular region to define a variable size bypass orifice for controlling fluid flow from the high pressure source inlet to the outlet, and the second set of sidewall openings cooperating with the second inner annular region to provide a substantially unrestricted flow of fluid from the high pressure source inlet to the outlet; and a counterbalancing force region associated with the piston and receiving a variable fluid pressure for supplying a variable counterbalancing force to the piston to urge the piston in a direction to increase the size of the variable bypass orifice to compensate for variable unbalance forces applied to the piston.

12. The bypass valve of claim 11, wherein the counterbalancing force region comprises an annular fluid flow region within the bypass valve defined in part by the first inner annular region and having the bypass orifice as an inlet and a flow restricting outlet communicating with the outlet.

* * * * *